United States Patent [19]

Maier

[11] 4,084,540
[45] Apr. 18, 1978

[54] APPARATUS FOR APPLYING LUBRICATING AND PROTECTIVE FILM TO PHONOGRAPH RECORDS

[75] Inventor: Bruce R. Maier, Columbia, Mo.

[73] Assignee: Discwasher, Inc., Columbia, Mo.

[21] Appl. No.: 798,382

[22] Filed: May 19, 1977

[51] Int. Cl.² .............................................. C23C 13/08
[52] U.S. Cl. ..................... 118/48; 184/1 R; 274/1 R; 274/47
[58] Field of Search ............ 184/1 R, 14 R; 401/1 N, 401/1 Q; 274/1 R, 47; 15/303, 306 R, 306 B, 310; 118/48–49.5, 506, 300, 313; 427/154–156, 248–251; 148/174, 175, 187

[56] References Cited

U.S. PATENT DOCUMENTS

| 557,043 | 3/1896 | Adams | 118/48 X |
|---|---|---|---|
| 1,994,668 | 3/1935 | Russell | 118/49 X |
| 3,028,683 | 4/1962 | Teiser et al. | 118/48 X |
| 3,448,788 | 6/1969 | Keene et al. | 148/1 R |
| 3,641,974 | 2/1972 | Yamada et al. | 118/48 |
| 3,672,948 | 6/1972 | Foehring et al. | 118/48 X |
| 3,673,983 | 7/1972 | Strater et al. | 118/48 |
| 3,934,546 | 1/1976 | Fukuzawa | 118/48 |
| 4,001,892 | 1/1977 | Castelli et al. | 274/47 X |

FOREIGN PATENT DOCUMENTS

12,114  5/1910  United Kingdom ................... 118/48

Primary Examiner—Morris Kaplan
Attorney, Agent, or Firm—H. Dale Palmatier

[57] ABSTRACT

A broad and flat housing of low height with a closed interior chamber to contain a phonograph record, the housing having reclosable access to the chamber, nozzle openings to direct film emission material across the face of the record in the chamber.

18 Claims, 12 Drawing Figures

APPARATUS FOR APPLYING LUBRICATING AND PROTECTIVE FILM TO PHONOGRAPH RECORDS

This invention relates to apparatus for use in application of a protecting and lubricating film to stereo phonograph records.

BACKGROUND OF THE INVENTION

Until now there has been no effective way of suitably applying a film to a stereo record so that the record will be lubricated or protected.

It has been previously proposed to apply a film to the face of a stereo phonograph record by simply standing a record on its edge and holding the record in that position while a spray of lubricant is directed at the face of the record. Such a hit or miss technique in applying a film to the face of the record is almost worse than applying no film at all, and in many instances is worse. By using such a method, the concentration of the spray material varies widely from one location to another on the face of the record so that one area has an over abundance of material applied while another area has essentially none at all. Also, droplet size may vary considerably, and of course a substantial amount of non-uniformity results because the spray nozzle may not be at correct distances from the face of the record.

SUMMARY OF THE INVENTION

This invention includes a housing to confine a stereo phonograph record. In the form illustrated, the lower side of the record is protected against treatment. The interior of the housing defines a chamber which generally conforms to the shape of the record and which defines an unobstructed open space over the entire record except the central label area.

A resilient mat is provided in the bottom of the housing to underlie the record, and a central lug or short post fits into the center hole of the record to minimize any side-to-side movement of the record in the housing during treatment.

The top of the chamber is defined by an openable cover, the central portion of which is depressed or recessed downwardly to bear downwardly against the central label portion of the record in order to physically hold the record in stationary position during treatment. The cover is hinged to the base along one side and is arranged to fit tightly around the remainder of the periphery to substantially seal the housing an confine the atmosphere in the interior chamber. The housing may incorporate anti-static components therein; and an anti-static mat may be utilized under the record.

A number of spray nozzles are disposed in the housing at regularly spaced intervals around the periphery of the interior. In the form shown, the housing is essentially square, and four such nozzles are located in the several corners of the housing. Each such nozzle is spaced significantly from the periphery of the record contained in the housing.

The nozzles in the housing are oriented so as to direct the emission therefrom substantially peripherally or tangentially of the grooved portions of the record and throughout a broad angle from the nozzle. The nozzles stand alone and none of the nozzles has a continuing supply of the emission material.

On the other hand, each of the nozzles has a receiving port opening to the exterior of the housing through which the emission material is received.

The material emitted from the nozzles in the housing is broken down into extremely fine particles so as to create a fog condition within the interior chamber wherein the emitted particles are so small that the fog can hardly be seen and such that the particles are rather uniformly dispersed throughout the atmosphere in the chamber so that with a short delay, the particles will fall by gravity and ultimately settle upon the face of the phonograph record confined in the housing. The result is to create a dry film lubricant on the face of the record and will minimize distortion producing friction between the record and pickup stylus when the record is revolved on a turntable.

The emission material for injection into the nozzles from the exterior is supplied in an aerosol type of module or cartridge provided with an exterior duct which is removably extendible into the several nozzles of the housing in succession to deliver a quantity of the emission material thereby. The module or cartridge of emission material is preferably provided with a valving system, known in the art, to deliver a metered quantity of its contents whenever the valve system is operated. For purposes of supplying sufficient emission material for treating the surface of a phonograph record, the cartridge may deliver approximately 67 milligrams of the emission material per operation of the valve system. Similar quantities or doses of the emission material are injected at each of the four nozzles in the housing.

It is emphasized that before the application of the film lubricant to the surface of the record is commenced, the record must be clean so as to remove all contaminants, oftentimes referred to as micro dust.

The record may be placed upon the base of the housing and cleaned while the record is in the housing to absolutely minimize handling of the record and exposure to the atmosphere between the time the record is cleaned and the time that treatment commences.

Although the nature of the emission material to produce the film lubricant on the face of the record is not critical to the present invention, it is noted that the emission material may be any of a number of base materials such as a fluorocarbon or silicone material. In certain instances, it is conceivable that the emission material might even be a form of oil.

Whereas it may be desirable in many instances to use a two-stage or a dual-stage mechanical breakup of the particles in the nozzles, the use of the two-stage system is not essential. In many cases, it may be satisfactory to use a single-stage breakup of the particles, or the breakup may be obtained by a diffusion lens or by an esoteric vapor draft method whereby a substance with low vapor pressure is emulsified into a vapor layer and that vapor layer is then drafted into the close environment of the housing.

It may also be desirable to use a recirculation system to both deposit and/or maintain efficiency in the deposition system. A drying system may be incorporated where air or some other gas may be circulated through the chamber to effect a certain specialty drying when the nature of the material requires such special drying.

The housing defining the treatment chamber will, in many instances, incorporate a hinged or removable cover, but in other instances the housing will be arranged so that the record may be slipped in, with or without a carrier drawer, or be rotated in and out on a swinging carriage, or the record may be actually dropped into the treatment chamber. Although in many instances the treating material is preferably supplied in an aerosol container, it may be supplied in another type of pressure system from a stationary source detachably connected to the housing by a tube and fitting with or without fixed nozzles in the housing.

BRIEF DESCRIPTION OF THE DRAWINGS

FIG. 2 is an enlarged detail section view taken approximately at 2—2 in FIG. 1.

DETAILED SPECIFICATION

One form of the invention is shown in the drawings and is described herein. The apparatus for use in applying a protective film to the face of a disc-type phonograph record is indicated in general by numeral 10 and includes a housing 11 of low profile and substantially square configuration. The housing includes a base 12 and a cover 13 which, in FIG. 2, is shown to be raised or open in the dotted line position P. The cover in the open position will normally be swung entirely upwardly to stand in an upright position, approximately normal with respect to the base 12. Both the base 12 and the cover 13 are constructed of rigid molded plastic. The cover 13 is formed of an opaque plastic rectangular frame 13.1 and a transparent central panel structure 13.2 facilitating observation of the record R lying in the housing and the treatment of it. The transparent panel 13.2 and the rectangular frame 13.1 are affixed together as by adhesives or by electronic welding so that the entire cover 13 is of unitary and integral construction.

The base 12 has a broad and flat and substantially circular panel 14 formed integrally thereof upon which a cushioning mat 15 of the same shape is affixed as by adhesive to protect the record R from engagement with any hard surface. The mat 15 may be of any suitable material, but it has been found that polyurethane foam is successful and in some instances it is desirable to use felt in the pad 15. The base panel 14 has a short post or lug 16 of low height projecting upwardly from the panel 14 and formed integrally thereof. The post or lug 16 projects upwardly through the mat 15 and serves to spindle the record R in predetermined location in the base 12.

The cover 13 and base 12 both have upright outer peripheral walls which are in vertical alignment with each other and have abutting edges or faces approximately midway of the height of the housing 10. Hinges 19 are provided at one side of the housing and secured to the cover and base sidewalls.

At the front portion 20 of the housing, the base and cover are cooperatively shaped as to define a storage pocket or chamber 21 to removably carry the aerosol cartridge 22 which is supplied for the purpose of propelling the film material into the interior chamber 23 of the housing. The pocket 21 is accessible for the purpose of removing the cartridge 22 when the cover 13 is swung upwardly to the open position.

The cover 13 also has a depending central portion 24 defining a substantially upright inner peripheral wall 25 and a panel 26 which traverses the inner peripheral wall 25 in abutting relation with the end of lug 16 and in closely spaced relation with the pad 15 as to accommodate the record R between the pad and the panel 26.

The inner peripheral wall 25 is circular in shape and is approximately the same size as the central label area of the record R.

At the opposite sides of the housing, the sidewalls 17 of the cover are provided with extension panels 13.3 formed integrally of the transparent panel of the cover to extend down in lapping relation with respect to the upright wall of the base 12 to provide a tight sealing relation for more thoroughly isolating the interior chamber 23 of the housing from the exterior atmosphere.

In each of the corner areas of the housing, a nozzle structure 30 is affixed on the base 12 for directing the atomized film material for application to the record in a general peripheral direction within the annular interior chamber 23.

The aerosol type cartridge 22 has a tailpiece or tube 31 of a stiff but not necessarily rigid plastic material. The tube 31 is formed integrally of a value actuating shroud 32 which is movable inwardly toward the body of cartridge 22 over a portion of the neck 22.1 thereof so as to actuate an internal valve system and cause a metered quantity of the film material contained in the cartridge 22 to be propelled outwardly under force of gas pressure in the cartridge. The cartridge and valve system therein are well known to persons of skill in the art, and one suitable valve system available on the market is the Emson Research valve system MP-20CP which has a metered delivery of the contents of the cartridge in the amount of 67 milligrams per shot or per dose. The insert or delivery tube 31 is insertable into each of the nozzles 30, for delivering a metered quantity of the film material to the nozzle 30. The cover 13 is provided with a plurality of socket openings or holes 33 in the extreme corners of the housing in alignment with the respective nozzle structures 30.

Each of the nozzle structures 30 includes a mounting well 34 formed integrally of the base 12 and having a slot-like port or opening 35 at one side thereof. A pre-assembled nozzle assembly 36 is inserted downwardly into the mounting 34 and is enclosed by a metal cap 37 having an access port 37.1 therein.

The nozzle assembly 36 has a receiving socket 37 formed therein with a socket opening 37.1 of such a size as to tightly receive the insert delivery tube 31 of cartridge 22 therein. A pair of internal ribs 38 in the socket 37 abut the end of the delivery tube 31 when inserted into the socket and allow the cartridge 22 to be pressed forwardly while the tube and shroud 32 are restrained, to thereby actuate the valve system and cause a metered quantity of the film material to be propelled into the socket 37.

Figure 3:
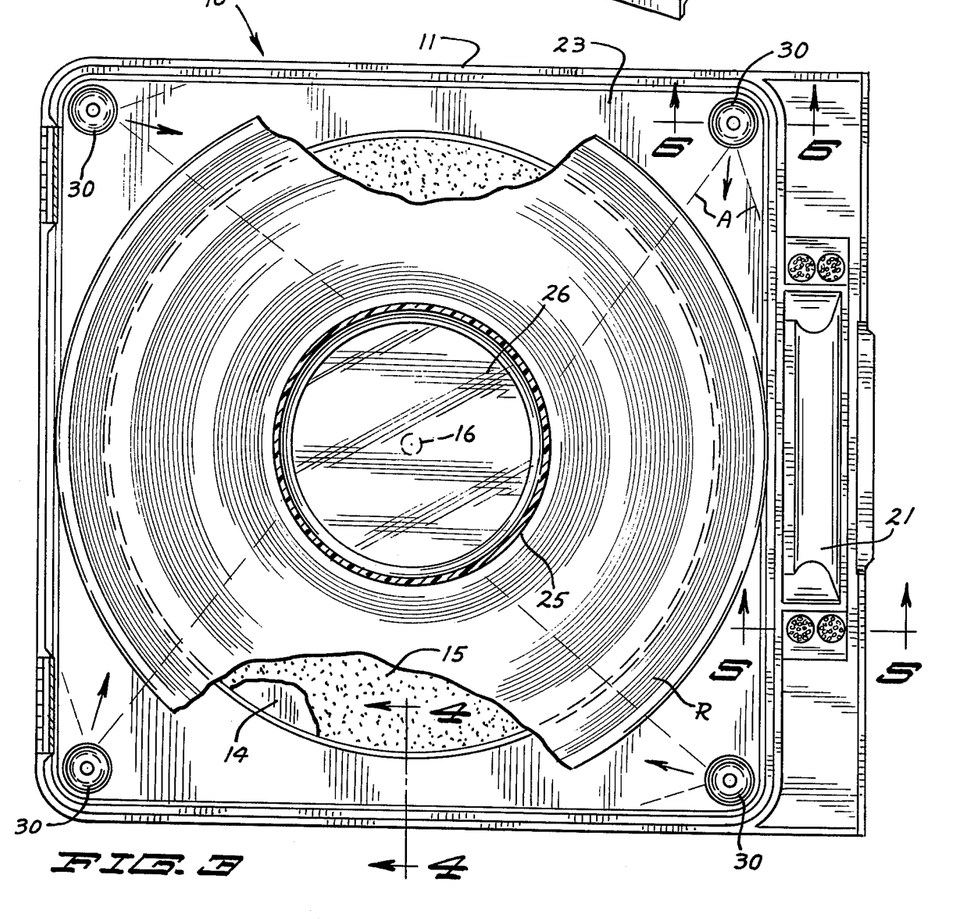
FIG. 3 is a plan view viewed substantially at 3—3 in FIG. 2.

An outlet aperture 39 from the bottom of the socket carries the propelled fluid material from the cartridge to the nozzle cap 40 which has a minute orifice therein through which the film material is forced and caused to break up into finely atomized particles. From the cap 40 of the nozzle structure, the film material is emitted in a cone-shaped emission pattern into the annular interior chamber 23 of the housing. The approximate angle of the emission from the nozzles is illustrated in FIG. 3 and indicated by the letter A. The atomized particles in the material emission is directed across the top of the record R so that portions of the emission will be directed to the record, and other portions of the emission will carry out a substantial distance and will then settle by gravity onto the face of the record, and still other portions of the emitted materials engage the inner peripheral wall 25 and the outer peripheral walls 17 and 18 of the cover and base, respectively, and will be caused, by their velocity, to bounce off these walls and settle by gravity onto the record to form a substantially uniform film on the record of substantially uniform thickness.

As a record in the chamber is being treated, the cartridge 22 will be operated at each of the four corners of the housing in succession; and during this process, the insert tube 31 is extended down into the respective socket 37 of each of the nozzle structure 30. The cartridge may be moved from one location to another rather quickly so that the treatment of a record can be accomplished within the span of a few moments, certainly less than one minute.

Because all of the nozzle structures are oriented in the same general direction, in FIG. 3, a substantially clockwise direction relative to the annular interior chamber, the rapid succession of emissions from the nozzle structures will cause some swirling of the atmosphere in the housing so as to contribute to the carrying of the emitted materials around the housing for uniform deposition upon the face of the record.

The front portion 20 of the housing has confronting fastening means in the cover 13 and base 12 and it is illustrated that a fabric type fastener such as containing minute loops 40 and plastic hooks 41 interfit with each other so as to hold the cover and base together. This fastening can be easily opened when it is desired to obtain access into the housing. This fastener 40 and 41 is known by its trademark in the marketplace, Velcro.

Figures 4, 5, 7, 9:
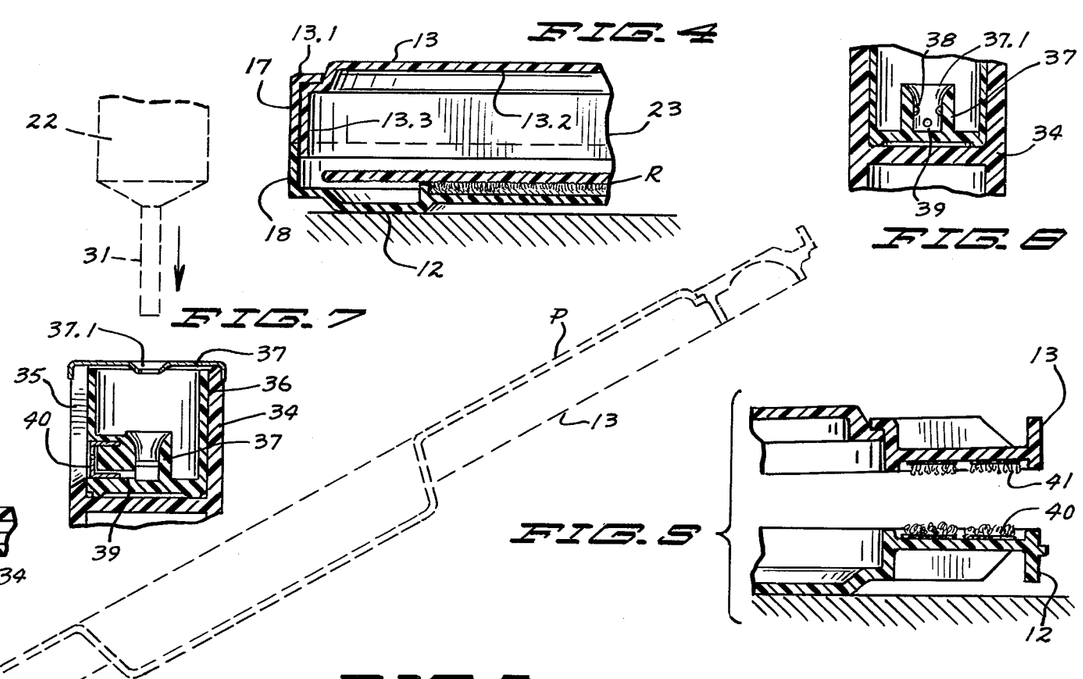
FIG. 4 is a detail section view taken approximately at 4—4 in FIG. 3.
FIG. 5 is a detail section view taken approximately at 5—5 in FIG. 3 and showing the cover slightly raised.
FIG. 7 is an enlarged detail section view taken approximately at 7—7 in FIG. 6.
FIGS. 9 - 11 are perspective views of modified forms of the invention.
Figure 6:
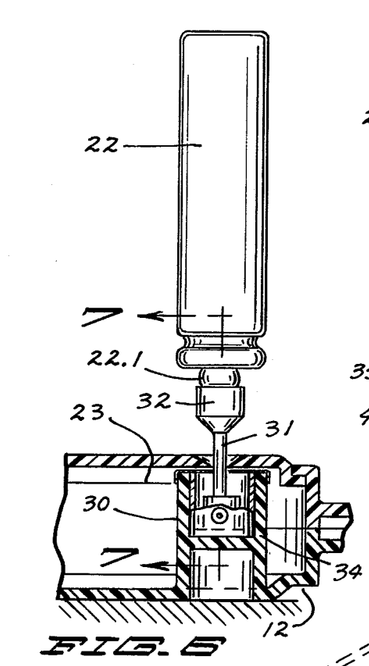
FIG. 6 is a detail section view taken approximately at 6—6 in FIG. 3.
Figure 8:
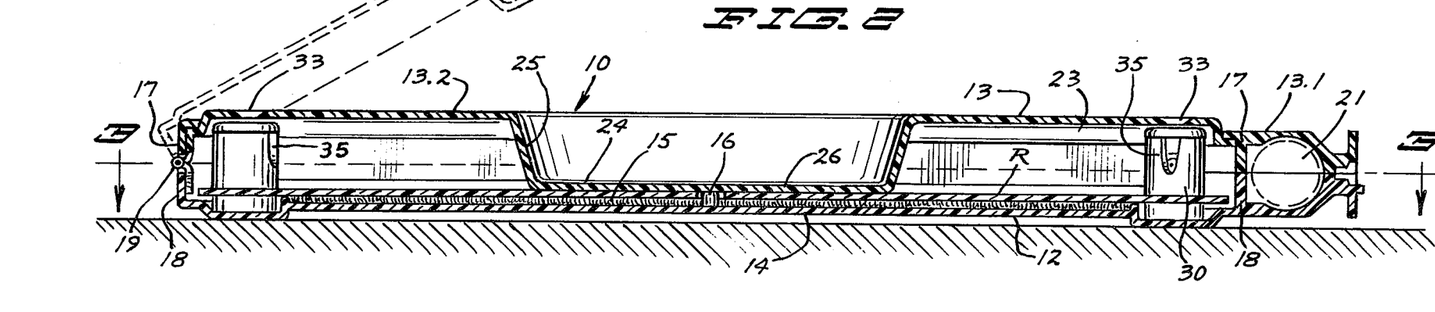
FIG. 8 is a partial detail section of FIG. 7.
Figures 9, 10, 11, 12:
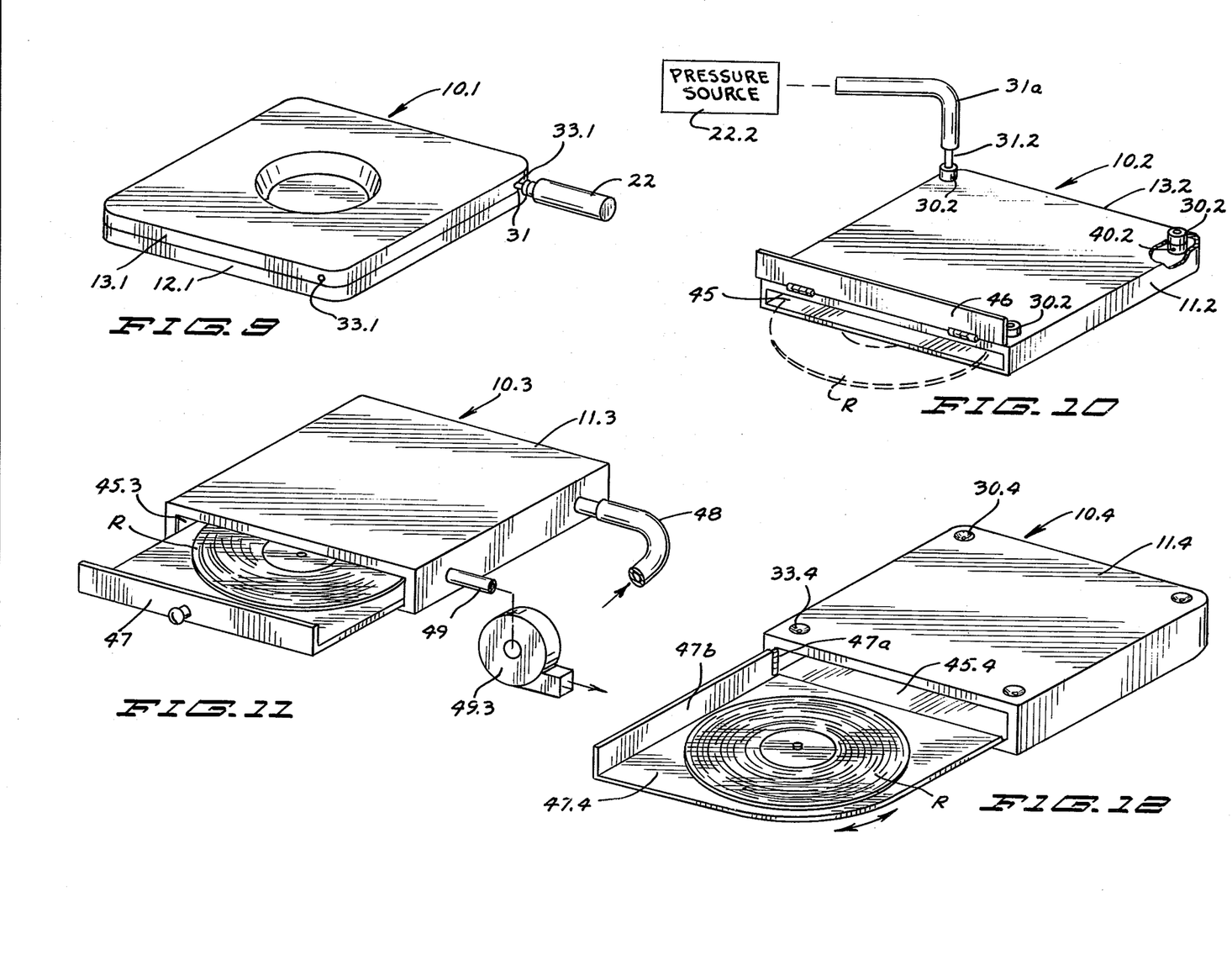
Figures 9, 10, 11:
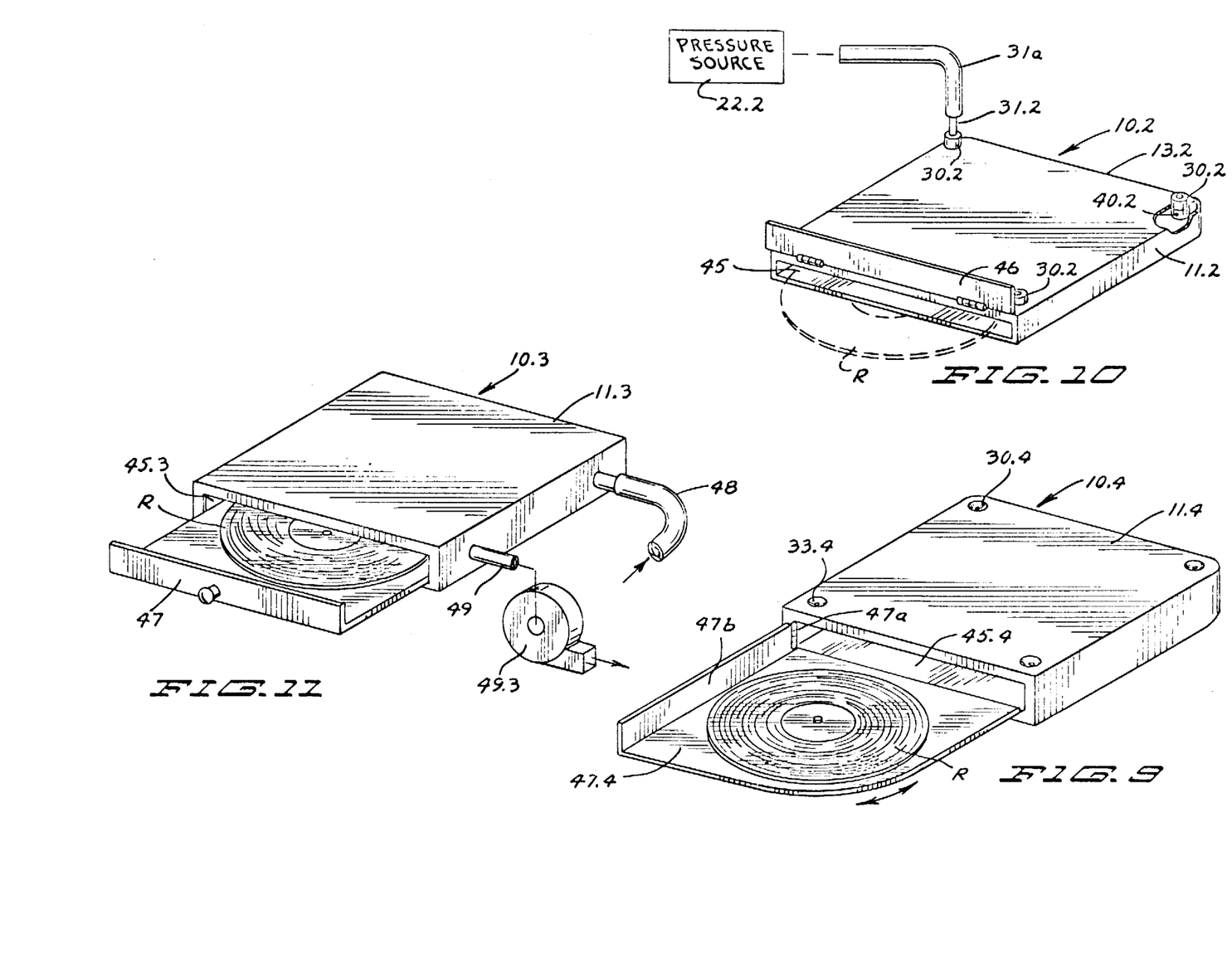

Modifications of various portions of the record treating apparatus are illustrated in FIGS. 9–11.

Figure 1:
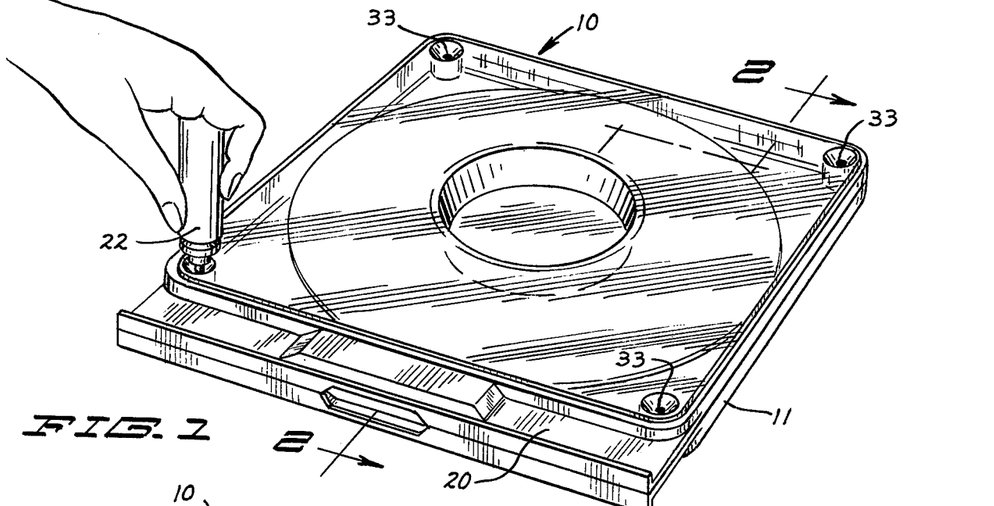
FIG. 1 is a perspective view of the invention.

In the form of the treatment apparatus 10.2 as illustrated in FIG. 10, the housing 11.2 is a substantially integrally formed in one peice (without an openable cover) but in this form, the housing has an entrance opening or slot 45 through which a record R may be passed. A closure or door 46 is hinged to the sidewall of the housing to close the slot 45 after the record has been inserted. Although the treating material might be injected into the treatment chamber within the housing in the manners illustrated in FIGS. 1 and 9, an alternate form of apparatus is incorporated into FIG. 10. The injection nozzles 30.2 are mounted on the top wall 13.2 of the housing with the nozzle orifice 40.2 being located immediately below the top wall. This arrangement provides space below the nozzles 30.2 to allow the record to slip into the interior chamber without interference. It should be particularly noted in this form of the invention that the top wall of the housing is flat and planar across its entire length and breadth and the housing does not have an internal peripheral wall (as at 25 in FIG. 2).

A source of the emission material is provided by a separate pressure source 22.2 which may be a permanent installation in a shop and will be connected to the treating chamber by an injection tube 31.2 and a flexible connecting hose 31a. The injection tube 31.2 may be sequentially inserted into each of the nozzles for applying suchh film material for deposit upon the record.

Another alternative form of the apparatus 10.3 is illustrated in FIG. 11 wherein the housing 11.3 has an elongate slot-type opening 45.3 in one side, and a drawerlike carriage 47 with a cushioning mat provided for carrying a record into and out of the treatment chamber. The front side of the carriage forms a closure for the opening 45.3 so as to tightly close the interior treatment chamber of the housing.

The treating material, in this form of the invention may be supplied by an esoteric vapor draft method wherein a treating material of low vapor pressure is emulsified into a vapor layer and is then drafted into the treating chamber within the housing through a conveying duct 48. For purposes of drawing the treating material into the chamber, a vacume duct 49 may be connected to a source of vacume pressure such as a fan 49.3. The fan may be connected into the vapor system for recirculating the vapor, and this system may also be utilized for introducing drying material such as air of other gases if the treating material may need drying after an application to the record.

In the form of the apparatus 10.4 illustrated in FIG. 9, the housing 11.4 again is of integral construction, without cover and base, and has an access opening 45.4 in one of the side walls. A carriage 47.4 is provided for carrying the record R into the interior treatment chamber of the housing, and in this version of the apparatus, the carriage 47.4 is hinged to the housing at 47a. Emission material is injected into the housing by nozzles 30.4 which are suspended from the top wall off the housing and have access openings 33.4 to accommodate the injection tube 31 of the aerosol container 22.

In this form of the invention, the carriage 47.4 has an upright closure wall 47b which serves as a closure for the access opening in housing when the record is swung inwardly into the treatment chamber.

What is claimed is:

1. Apparatus for applying a protective film to the face of a disc-type phonograph record from a cartridge adapted to deliver rapidly propelled film material in metered quantities, comprising a broad and generally flat housing defining an interior chamber to entirely enclose such a phonograph record, the housing having a base and a cover, the base having a broad and flat cushioned supporting surface to carry the record and a central lug of low height upon which the record is spindled, the cover having peripheral edges to fit closely to the base to isolate the interior chamber from the exterior atmosphere and the cover also having a central clamping shoe spaced from the peripheral edges in confronting relation with the central lug to retain the record in spindle relation to the lug, the cover also having a plurality of holes therethrough adjacent the peripheral edges, the interior chamber being substantially unobstructed adjacent the clamping shoe and entirely around the periphery thereof, a plurality of nozzles affixed to the housing and located in the interior chamber of the housing, the nozzles being spaced from each other at regular intervals and adjacent said peripheral edges, the nozzles being oriented substantially peripherally of the interior chamber, and each of the nozzles having an upwardly oriented inlet socket end aligned with a respective hole in the cover to receive the delivery tube of such a cartridge.

2. Apparatus for applying a protective film to the face of a disc-type phonograph record from a cartridge adapted to deliver rapidly propelled film material in metered quantities, comprising a broad and generally flat housing defining an interior chamber of low profile, the housing having a base and also having a cover overlying substantially the entire interior chamber to provide access for emplacing and removing such a record, the base having a broad and flat cushioned supporting surface to carry the record and central lug of low height upon which the record may be spindled, the housing having an upright outer peripheral wall to isolate the interior chamber from the exterior atmosphere, and also having an upright inner peripheral wall spaced entirely from said outer wall and centrally of the interior chamber whereby the open interior chamber is generally annular in shape, the inner peripheral wall being spaced slightly above the supporting surface to accommodate such a record therebetween, the top of the housing having a plurality of socket holes therein, and a plurality of nozzles affixed to the housing and located in the interior chamber of the housing and closely adjacent the outer peripheral wall thereof, the nozzles being spaced from each other at regular intervals and being oriented substantially peripherally of the annular interior chamber, each of the nozzles having a spray angle whereby to direct the emitted film material across the face of the record and to cause the emission material to engage and bounce from said outer and inner peripheral walls, and each of the nozzles having an upwardly oriented inlet socket aligned with a respective socket hole in the top of the housing to receive the delivery tube of such a cartridge from which such film material is supplied to the nozzle.

3. The invention according to claim 2 and the inner peripheral wall being affixed to the cover.

4. The invention according to claim 3 and a panel traversing the inner peripheral wall and confronting the lug in close fitting relation to overlie the central label area of the record.

5. The invention according to claim 1 and the outer peripheral wall having portions affixed to the base and portions affixed to the cover, said cover and base portions of the peripheral wall having abutting and overlapping faces in engagement with each other to substantially seal the interior of the chamber closed.

6. The invention according to claim 2 and said housing including hinge means and releasable fastening means holding the base and cover together.

7. Apparatus for applying a protective film to the face of a disc phonograph record from an aerosol cartridge adapted to deliver rapidly propelled film material in metered quantities, comprising a broad and generally flat housing defining an interior chamber of low profile, the housing having a base and a cover hinged together, the base and cover both having upright outer peripheral walls abutting each other in edge-to-edge relation and extending entirely around the periphery of the housing to isolate the interior chamber from the exterior atmosphere, the base having a broad and flat cushioned supporting surface to carry the record and a central lug of low height upon which the record may be spindled, the cover having a central portion depending toward and concentric of said lug and defining an upright inner peripheral wall centrally of the interior chamber whereby the open interior chamber is genuinely annular in shape, the depending central portion of the cover also defining a panel adjacent the lower edge of said inner peripheral wall and confronting said central lug in closely spaced relation to accommodate such a phonograph record on the cushioned supporting surface of the base and hold the record in place on the lug, the housing having a substantially rectangular shape with corner areas spaced well outwardly from the cushioned supporting surface of the base, the cover having a plurality of socket holes therethrough and located adjacent said corner areas of the housing, and a plurality of nozzles affixed on the base in the corner areas of the housing and located in the interior chamber closely adjacent the outer peripheral wall, the nozzles all being oriented peripherally of the annular interior chamber and all of the nozzles being similarly oriented with respect to the inner peripheral wall, each of the nozzles having a wide spray angle whereby to direct the emitted film material across the face of the record and cause the emission material to engage and bounce from the inner and outer peripheral walls and from the cover as to evenly distribute the emitted film material and cause deposits thereof uniformly across the grooved annular face of the record, said nozzles having upwardly oriented inlet sockets aligned with such socket holes in the cover to receive the insert delivery tube of such a cartridge from which film material is supplied into the nozzle to be emitted therefrom.

8. Apparatus for applying a protective film to the face of a disc type phonograph record from a gaseous source of such film material, comprising a broad and generally flat housing having top, bottom and side walls defining an interior chamber to entirely enclose such a phonograph record and isolate the environment in the chamber from the atmosphere at the exterior of the housing, the interior chamber and side walls having a height which is significantly less than the length and width of the top and bottom walls, the housing being provided with the means for obtaining access into the chamber for inserting and removing such a phonograph record, the housing having gas flow receiving port means directing the inflowing film material in gaseous form in a direction generally between and substantially parallel to the top and bottom of the housing to facilitate substantially uniform deposition of the film material on the phonograph record, said port means including a plurality of stationary nozzles disposed spacedly about the periphery of the housing, and each nozzle having an inlet socket through which the gaseous film material delivery means is received and an outlet orifice directed between and substantially parallel to the top and bottom of the housing.

9. The invention according to claim 8 wherein said housing has a broad and flat cushion supporting surface in the interior chamber to carry the record thereon.

10. The invention according to the claim 8 wherein said socket means are upwardly oriented.

11. The invention according to claim 10 and said nozzles being supported on the bottom of the housing, the top of the housing having access holes aligned with such inlet sockets of the nozzles.

12. The invention according to claim 10 and said nozzles being mounted on the top of the housing with the outlet orifices disposed within the interior chamber.

13. The invention according to claim 8 and said housing having a base and a cover respectively defining said bottom and top of the housing, the base and cover being hinged together.

14. The invention according to claim 8 and said housing having a base and a cover respectively defining the bottom and top of the housing, the base and cover interfitting with each other tightly around the entire periphery of the housing and being entirely separable to provide access into the interior chamber.

15. The invention according to claim 8 wherein one of the sidewalls of the housing has a slot-shaped access opening therein through which the record may be inserted into the interior chamber, and a closure of said opening.

16. The invention according to claim 15 and also including a carriage to support such a record and movable through the slot-type opening for insertion and removal of the record, the closure being mounted on the carriage to obstruct the opening when the carriage is moved into the housing.

17. The invention according to claim 16 wherein the said carriage is a drawer-like structure slidable linearly into and out of the housing.

18. The invention according to claim 16 and said carrige being hinged to the housing and being movable about a hinge axis extending transversely of the top and bottom of the housing to move the carriage with a rotory type motion into and out of the housing.

* * * * *

UNITED STATES PATENT OFFICE
CERTIFICATE OF CORRECTION

PATENT NO. : 4,084,540                    Page 1 of 2

DATED : April 18, 1978

INVENTOR(S) : Bruce R. Maier

It is certified that error appears in the above–identified patent and that said Letters Patent are hereby corrected as shown below:

Sheet 3 of the drawing should appear as shown on the attached sheet.

Signed and Sealed this

Fifteenth Day of May 1979

[SEAL]

Attest:

RUTH C. MASON
Attesting Officer

DONALD W. BANNER
Commissioner of Patents and Trademarks